United States Patent
Delaney, IV

(10) Patent No.: US 6,920,872 B2
(45) Date of Patent: Jul. 26, 2005

(54) HEAT REDUCER

(76) Inventor: John Patrick Delaney, IV, 7318 Sherwood Dr., Huntington Beach, CA (US) 92648

( * ) Notice: Subject to any disclaimer, the term of this patent is extended or adjusted under 35 U.S.C. 154(b) by 651 days.

(21) Appl. No.: 10/104,463

(22) Filed: Mar. 22, 2002

(65) Prior Publication Data

US 2003/0178019 A1 Sep. 25, 2003

(51) Int. Cl.[7] .............................. F24C 15/10; F28F 3/02
(52) U.S. Cl. ......................... 126/215; 165/185; 165/135
(58) Field of Search .............................. 126/215, 214 R, 126/214 C, 212; 99/447; 165/135, 185

(56) References Cited

U.S. PATENT DOCUMENTS

| | | | | |
|---|---|---|---|---|
| 680,494 A | * | 8/1901 | Meyer | 126/215 |
| 864,518 A | * | 8/1907 | Cruickshank | 126/215 |
| 923,690 A | * | 6/1909 | Newsam | 126/220 |
| 1,004,146 A | * | 9/1911 | Carter | 126/221 |
| 1,164,066 A | * | 12/1915 | Burleson et al. | 126/215 |
| 1,737,498 A | * | 11/1929 | Hanes | 126/215 |
| 2,760,481 A | * | 8/1956 | Sprung | 126/215 |
| 3,805,765 A | * | 4/1974 | Nodae | 126/215 |
| 4,059,092 A | * | 11/1977 | Bourboulis | 126/215 |

FOREIGN PATENT DOCUMENTS

JP         55-68593 A  *  5/1980  ............. F28F/3/02

* cited by examiner

Primary Examiner—Josiah C. Cocks

(57) ABSTRACT

Two plates (30 & 32) made of a solid, or very heavy sheet of heat resistant material with one side that is flat and one side that has grooves or other relief in the surface reducing the surface area on the otherwise uninterrupted plane of that side. This relief creates fins (38). One plate will have larger fins (38) with more surface area than the other plate. The plates (30 & 32) are attached to each other so that the flat or non-relieved sides of the plates face one another utilizing spacers (4) that keep the plates apart thus creating a primary air-gap (9) between the plates. Also supplied is a removable handle (40) which engages the plates in holes through each plate. The heat reducer is placed on a cooking heat source and a cooking vessel is placed on top of the heat reducer.

1 Claim, 7 Drawing Sheets

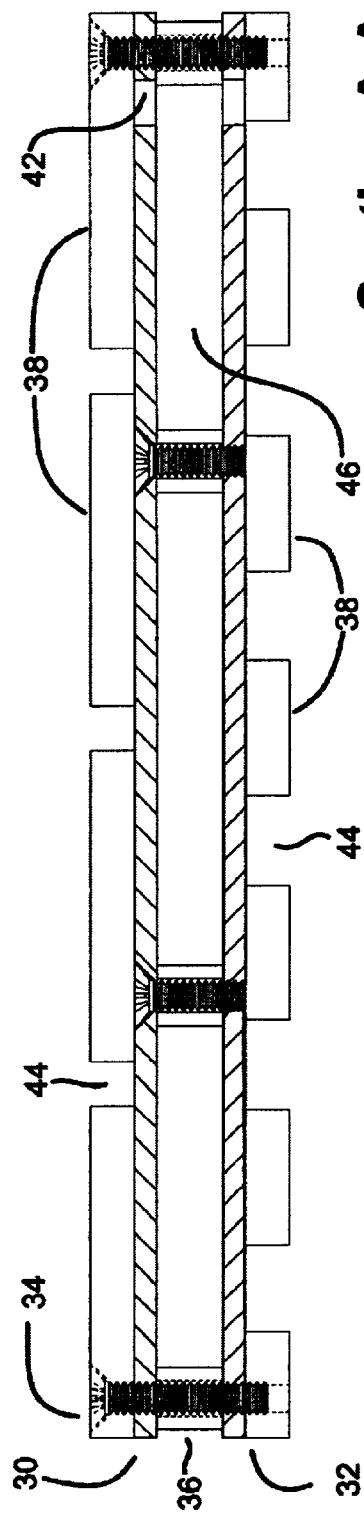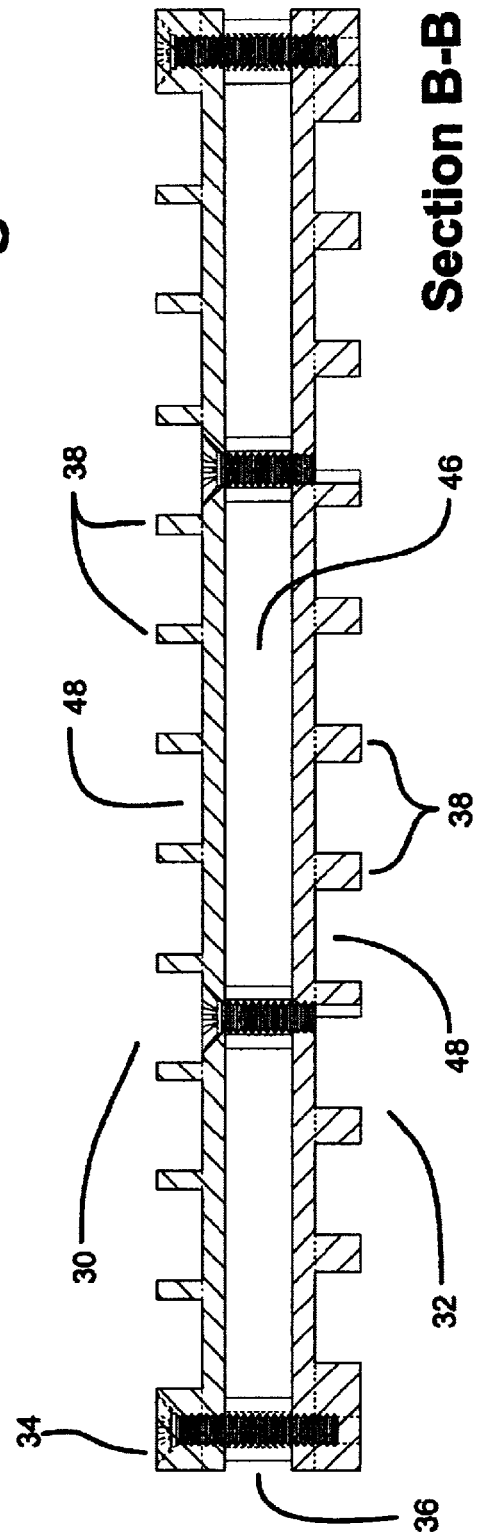

HEAT REDUCER

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

This invention relates to the class 126/215, Stoves and Furnaces/Elevating Support. Described here is an assembly that reduces the heat transmitted from a heat source to a vessel, like a pot, used for cooking food or heating other substances that can be contained in the pot.

It is a common requirement for heat to be reduced to very low levels when cooking food such as soups, sauces, and stews, usually in a pot. This heat reduction is to prevent the food from boiling, and from being either burned or scorched by too much heat. Also it helps prevent the food from sticking to the pot. Without heat reduction the cook has to constantly stir the food too. So some way to reduce the heat is also a way to make the cook's job easier and more effective.

This heat reduction can be accomplished to some degree by reducing the fuel, electric power, or air supplied to the stove top burner, or other cooking heat source. This makes the flame smaller for gas type burners. In most cases, the heat source can not be lowered enough to prevent boiling, burning of the food, or adhesion of the food to the pot. Some newer stoves have special low heat burners; in these cases it may be desirable to have more than one pot on reduced heat. So some way to reduce the heat from the remaining higher output burners would be useful. However many older stoves at this time do not have special low heat burners. Owners of these stoves have few means available to them at this time to attain a satisfactory level of heat reduction for cooking that requires truly low heat. The heat reducer described here fills the need for low heat cooking on older stoves more effectively than the prior art in existence today in the field. It also provides the owners of newer stoves having low output burners more ways to use their high output burners thus expanding the usefulness of their newer stove.

The many inventors who have addressed the low heat cooking problem, have done so with devices designed to be placed between the heat source and the cooking vessel to diffuse the heat across the bottom of the pot to achieve even cooking across the bottom of the pot or pan. However, these devices are not intended to substantially reduce the heat ultimately reaching the pot. Many of them have, in fact, been designed to increase the amount of heat reaching the pot. These devices are typically metallic. They can be found made of thick or thin metal plates or sheets. They can be found made of raw unfinished metal or metal which is plated, coated, or glazed. In most cases they are designed to fit on a large variety of stove top burners. A lesser number of inventors have attempted to address the low heat cooking problem with devices that regulate the heat reaching the pot by means of damper like devices. These devices tend to be large and somewhat awkward. Introducing mechanical movements into a stove top device is also not good as the heat tends to scorch and warp metal parts making them very hard to use. Some other inventors have attempted to address this problem in ways that insulate the pot from the heat by introducing an air-gap or an insulating material such as steel wool, mineral wool, mica, or asbestos. Introducing insulation is a good way to address the low heat cooking problem, however, it is not enough as almost anything that sits directly on a burner eventually becomes saturated with enough heat that is passes the heat along to the pot resting on it and overheats the food in time. Most of these devices are effective for short periods of time as heat reducers. But, they become saturated with heat after a short while. Then the food begins to become overheated again and the burning, scorching, boiling, and stirring begin anew.

Examples of this prior art are:

1. An 8 in cast iron heat diffuser made by Ilsa Srl, 10093 Collegno Torino, Italy, on the World Wide Web at http://www.ilsa-italy.it. A device similar to this is marketed by the Moulinex Group of France and can be found at http://www.cooking.com, search on the key word "diffuser". This is a cast Iron disc with a hole in the center that diffuses the heat across the cast iron and allows hot gas to still come in direct contact with the pot or pan. It also has several ridges that keep the pot from coming in direct contact with the disc thus reducing the amount of surface area in contact with the pot by a great deal. I purchased and tested this device. It was not capable of enough heat reduction to prevent the test sauces, soups, and water from maintaining a medium boil on a low flame.

2. The Flame Tamer by Kuhn Rikon of Switezrland, on the world wide web at http://www.kuhnrikon.com. This is a flat metallic plate approximately 11 inches in diameter intended to shield the company's pressure cookers from hot gas flames. I purchased and tested this device. It was not capable of enough heat reduction to prevent the test sauces, soups, and water from maintaining a medium boil on a low flame.

3. A 7 inch cast iron heat diffuser made or marketed by VillaWare Manufacturing Company, 3615 Superior Avenue #44, Cleveland Ohio 44114. This is a cast iron disc to spread the heat out with a series of small ridges that elevate the pot off the disc. This reduces the contact with the disc by a great deal and creates an insulating air-gap between the disc and the pot or pan. This device is very similar to a device appearing on the Ilsa web page, mentioned above. This device was not tested.

4. An un-named or un-branded generic heat diffuser made out of a corrugated and perforated metallic disc. This allows a reduced amount of hot gas to come in contact with the pot and decreases the surface area of the pot or pan in contact with the diffuser by way of the raised corrugations. I purchased and tested this device. It was not capable of enough heat reduction to prevent the test sauces, soups, and water from boiling. This device exhibited the least amount of heat reduction. This device was purchased at Sur La Table in Newport Beach, Calif. It also appears on the World Wide Web at http://www.thegadgetsource.com, search on the key word "diffuser".

5. An Even Heat Diffuser Burner Plate manufactured by Nordic Ware, 5005 Hwy 7, Minneapolis Minn., 55416. This is a simple 8 inch diameter plate of heavy gauge, coated, sheet metal with the edge turned down for it to saddle the burner. I purchased and tested this device. It was not capable of enough heat reduction to prevent the test sauces, soups, and water from maintaining a medium boil on a low flame.

6. U.S. Des. Pat. No. 169,799 to V. P. Bourne-Vanneck which appears as a hollow sheet metal form having one side for the pot and one side to face the burner. The pot facing side has multiple depressions in it. This reduces the surface area in contact with the pot, except in the center where it is flat. The burner facing side is shaped in such a way as to trap heat and increase the surface area of the heated metal to the air-gap between the top on the bottom. This design would be not be as durable as a the other prior art mentioned and would not regulate the heat as well being made of a thinner sheet metal material instead of a heavy casting or a thick metal plate. The tendency of the bottom to retain hot gases is counter to the intent of reducing the heat reaching the pot.

7. U.S. Pat. No. 2,476,186 discloses a Simmerer. This device utilizes three layers of an insulating material separated and enclosed by metal sheets to shield the pot from the heat. It provides no means to regulate the heat ultimately conducted to the pot. Once the device becomes saturated with heat the effect will be the same as being exposed directly to the heat source.

8. U.S. Pat. No. 2,742,850 discloses an Apparatus For Cooking And Serving Foods. This device is a multipurpose cooking device with multiple parts. In at least one configuration it can be used to support another pot in a way that will shield the pot from the heat. However in this configuration the device is designed to concentrate sufficient heat to broil food. This amount of heat is counter to the intent of producing low enough heat as not to burn or scorch food.

9. U.S. Pat. No. 2,478,614 discloses a Cooking Heat Control Plate Assembly. This device aims to control the heat reaching the pot with three discs that can be separated from one another to varying degrees. This device will become saturated with heat and eventually pass it to the pot via the flat surfaces on the plates.

10. U.S. Pat. No. 1,786,562 discloses a Heat Insulating Device for Cooking Utensils. This device aims to control the heat reaching the pot with two discs that can be either touching or separated from each other. Again, however, the surface that the pot rests on is flat. Once the device is saturated with heat it will be passed to the pot as if no insulation has been provided at all.

11. U.S. Pat. No. 1,731,769 discloses a Cooking Apparatus. This device is a stove top oven. Its base could be used for a heat reducer if used alone. However I see this device becoming saturated with heat and it does not provide enough distance from the surface of the base to the pot to reduce the heat transmitted to the pot.

12. U.S. Pat. No. 1,258,899 discloses a Burner Guard. This device employs a damper assembly to regulate the amount of hot gas reaching the pot. However it is flat on the top thus facilitating full heat transfer to the pot once the device comes up to temperature.

13. U.S. Pat. No. 1,004,146 discloses a Protective Device for Cooking Utensils. This device will distribute the heat but will not reduce it and it is substantially flat on the top an bottom which will allow the majority of the heat to be transferred to the pot.

14. U.S. Pat. No. 1,114,087 discloses a Heat Distrbuter or Plate. This device utilizes an insulating air-gap which will reduce the heat transferred. It is also ribbed along the top thus reducing the surface area in contact with the pot. However there is not adequate space between the pot and the top of the device nor could there be so given the fabrication methods specified in the patent.

15. U.S. Pat. No. 852,116 discloses a Stove Cover or Mat. This device utilizes and insulating air gap of one eighth to on quarter of an inch between to flat metal plates to reduce the heat reaching the pot. This is not enough space. Also the flat surfaces will conduct too much heat.

16. U.S. Pat. No. 977,052 discloses a Cooking or Heating Utensil. This device essentially introduces an insulating mat and a support for the mat between the pot and the heat. The base is specified in a way that will contain much of the heat radiating up from the heat source. There is no way for heat to escape the confines of the mat and the base except up through the insulation and the pot. While the insulating mat will at first slow the heat transfer it will eventually become saturated with heat and pass that along to the pot. This will distribute the heat well, but it will not serve to reduce the heat.

17. U.S. Pat. No. 470,546 discloses a Heat Regulator For Cooking Stoves. This device employs a damper assembly to regulate the amount of hot gas reaching the pot. However it is flat on the top thus facilitating full heat transfer to the pot once the device comes up to temperature.

18. U.S. Pat. No. 554,343 discloses a Heat Regulator for Cooking Stoves. This device is truly designed to regulate the heat escaping the stove hole on a wood or coal burning stove via a damper assembly. As such it relies on the pot supports on such a stove and has no pot support of its own.

19. U.S. Pat. No. 1,725,180 discloses an Oven Grate. This device is designed to be placed in an oven and regulate the up draft of heat with a damper assembly. It is not designed with the structures to directly support a pot and as illustrated in the patent would be too large to fit on a stove top. Futher, even if it were reduced in size, it would become saturated with heat in time and conduct the heat to the pot as the pot would be very close to the surface of the device.

20. U.S. Pat. No. 2,003,773 discloses a Burner Guard for Cooking Utensils. This device uses a complex assembly of adjustable baffles to regulate the hot gasses reaching the pot. This device will trap the hot gasses and distribute them more evenly but it will not reduce the total heat reaching the pot substantially as a result of trapping the heat energy. This device is also complex and it will be subject to operational problems over its life as the heat damages the moving parts.

21. U.S. Pat. No. 2,491,749 discloses a Thermostatic Heat Control for Waterless Cookers. This device uses a very complex assembly to regulate the heat reaching the device by means of a thermostatically controlled mechanical damper. This device will be too expensive to manufacture as to be practically affordable by most domestic users. It also lacks a sufficient supporting structure for pots of various sizes.

22. U.S. Pat. No. 849,083 discloses a Heating Apparatus. This device is designed to increase the amount of heat captured from the burner and as such does nothing to reduce the heat reaching the pot.

23. U.S. Pat. Nos:

| | | | |
|---|---|---|---|
| 537,886, | 1,158,727, | 1,267,263, | 1,808,550, |
| 510,010, | 1,158,135, | 1,243,044, | 1,755,603, |
| 418,244, | 1,109,323, | 1,633,977, | 2,285,698, |
| 469,597, | 1,095,075, | 1,798,758, | 1,881,428, |
| 394,706, | 1,067,428, | 1,867,957, | 4,406,942, |
| 366,988, | 1,533,510, | 1,864,715, | 3,687,127, |
| 989,399, | 1,510,030, | 4,059,092, | 2,030,519, |
| 966,579, | 1,509,630, | 4,126,120, | 408,216, |
| 928,634, | 1,509,445, | 2,513,011, | 115,649, |
| 897,928, | 1,465,133, | 2,565,726, | 1,392,898, |

-continued

| | | | |
|---|---|---|---|
| 864,518, | 1,463,837, | 2,760,481, | 2,593,003, |
| 1,232,493, | 1,431,696, | 2,833,907, | 1,635,286, |
| 1,164,368, | 1,391,291, | 2,599,923, | 1,083,503 |
| 1,164,066, | 1,367,333, | 1,926,233, | |
| 1,161,805, | 1,350,700, | 1,810,132, | |

All seek to separate the pot from the heat source via a number of means and unique embodiments. Each of these is either open, perforated, ventilated or have some means of allowing hot combustion gases to come into contact with the pot. It has been established in some of this prior art that it takes very little heat to keep already heated food warm or even boiling. None of these devices listed has the capacity to reduce the heat to a low enough level as they allow a substantial amount of hot combustion gas to come in contact with the pot directly.

24. U.S. Pat. Nos:

| | | | |
|---|---|---|---|
| 720,401, | 1,714,558, | 1,613,534, | 3,805,765, |
| 533,439, | 1,063,526, | 1,785,182, | 263,108, |
| 483,932, | 1,011,487, | 2,030,519, | 138,062, |
| 996,087, | 1,497,643, | 1,948,124, | 74,869, |
| 990,102, | 1,466,166, | 1,941,866, | 30,175, |
| 990,102, | 1,737,498, | 1,922,420, | 1,829,368, |
| 983,400, | 1,698,926, | 3,344,735, | 1,698,927 |
| 978,402, | 1,698,870, | 3,307,531, | |
| 923,690, | 1,695,711, | 4,236,503, | |
| 1,219,014, | 1,657,351, | 4,927,997, | |

All of these patents involve single layer imperforate barriers between the pot and the heat source allowing the pot to come in very close proximity or rest directly on the hot top surface of the device. As demonstrated in my testing this family of design is not effective in preventing heat transfer or reducing heat transfer to the pot. While the use of these devices is probably effective in evening out the heat they do not satisfactorily accomplish the objective of preventing scorching or burning of the food.

Prior art outside the field of stove top cooking related devices can be found in numerous heat exchange, heat reflectance, and heat distribution devices.

Some are contained in cooking ovens or grills such as in U.S. Pat. No. 5,277,106 to Raymer et al. or U.S. Pat. No. 6,337,466 to Chasen, or U.S. Pat. No. 5,335,868 to Haen, or U.S. Pat. No. 5.782,230 to Linnebur et al. This group of devices are designed to evenly distribute heat by conduction and reflectance but are not designed to prevent or otherwise control the amount of heat reaching a cooking vessel and in fact are aimed at maximizing the amount of heat reaching the cooking vessel or food product.

Some are contained in numerous heat exchange devices aimed at radiating heat from thing like engines, machines, and electronic components. These have the commonality of radiating heat to the atmosphere, fluid or some other medium. They would not be practically applied to the process of cooking food in a pot or pan. Examples of these are U.S. Pat. No. 6,021,844 to Batchelder, U.S. Pat. No. 6,067,712 to Randlett et al., and U.S. Pat. No. 6,261,448 to Merchant et al.

In summary, here are the basic approaches to the problem and the disadvantages of each:

a) Heat diffusing or distributing with imperforate barriers—This approach takes the heat energy and spreads it out but does not reduce the heat energy reaching the pot adequately.

b) Heat diffusing or distributing with perforated barriers—This approach takes the heat energy and spreads it out and it allows some or all of the hot combustion gases to reach the pot. In some cases these devices still allow the flame to reach the pot. Again these devices do little to ultimately reduce the total heat transmitted to the pot.

c) Dampers or baffles—These devices attempt to control the amount of heat reaching the pot by reducing or cutting off the hot combustion gas from reaching the pot. These involve several moving parts. They tend to be complex. It is known that moving parts can seize when they are exposed to heat and they expand. Also the by products of cooking such as accumulated grease will, over time, makes these devices difficult to keep operational.

BRIEF SUMMARY OF THE INVENTION

In accordance with this present invention a heat reducing device or heat reducer that diffuses and reduces the heat transmitted from a heat source to a pot used for cooking food. This device is composed of two plates made of a heat resistant material. Each of these plates has one side that is flat and one side that has a shape, pattern, or relief to it. This shape reduces the surface area of hot material exposed at the plane of the plate on the shaped side where the pot will come in contact with it. One plate will have more or less surface area at the plane of the plate than the other. These plates are attached to each other by a means that spaces them apart from each other thus creating an insulating air-gap between the plates. The flat sides of the plates face each other. The shaped sides of the plates face outward. The heat reducer is fitted with a removable handle to facilitate easy movement of the heat reducer.

OBJECTS AND ADVANTAGES

Several objects and advantages of the present invention are:

a) to provide a heat reducing device that prevents foods from boiling fast, scorching, sticking, or burning in the vessel in which they are being cooked in over long periods of time;

b) to provide a heat reducing device which provides multiple rates of heat transfer allowing the user flexibility in achieving the desired results on different heat sources;

c) to provide a heat reducing device that keeps the food at a consistent temperature d) to construct the heat reducer in such a manner as to prevent warping and buckling as the device warms up and cools down e) to provide a simple means to easily pick up and move the heat reducer such as a removable handle f) to provide a heat reducer that is simple to make g) to provide a heat reducer that is affordable.

BRIEF DESCRIPTION OF THE DRAWINGS

FIG. 6 is a cross section of the heat reducer.

FIG. 7 is a cross section of the heat reducer on a cut perpendicular to FIG. 6.

REFERENCE NUMERALS IN DRAWINGS

| | |
|---|---|
| 20 | the heat reducer |
| 30 | high-rate-plate |
| 32 | low-rate-plate |
| 34 | Fastener |
| 36 | Spacer |
| 38 | Fins |
| 40 | Handle |
| 42 | handle holes |
| 44 | stress relief notch |
| 46 | primary air-gap |
| 48 | secondary air-gap |

DETAILED DESCRIPTION OF THE INVENTION

Figure 1:
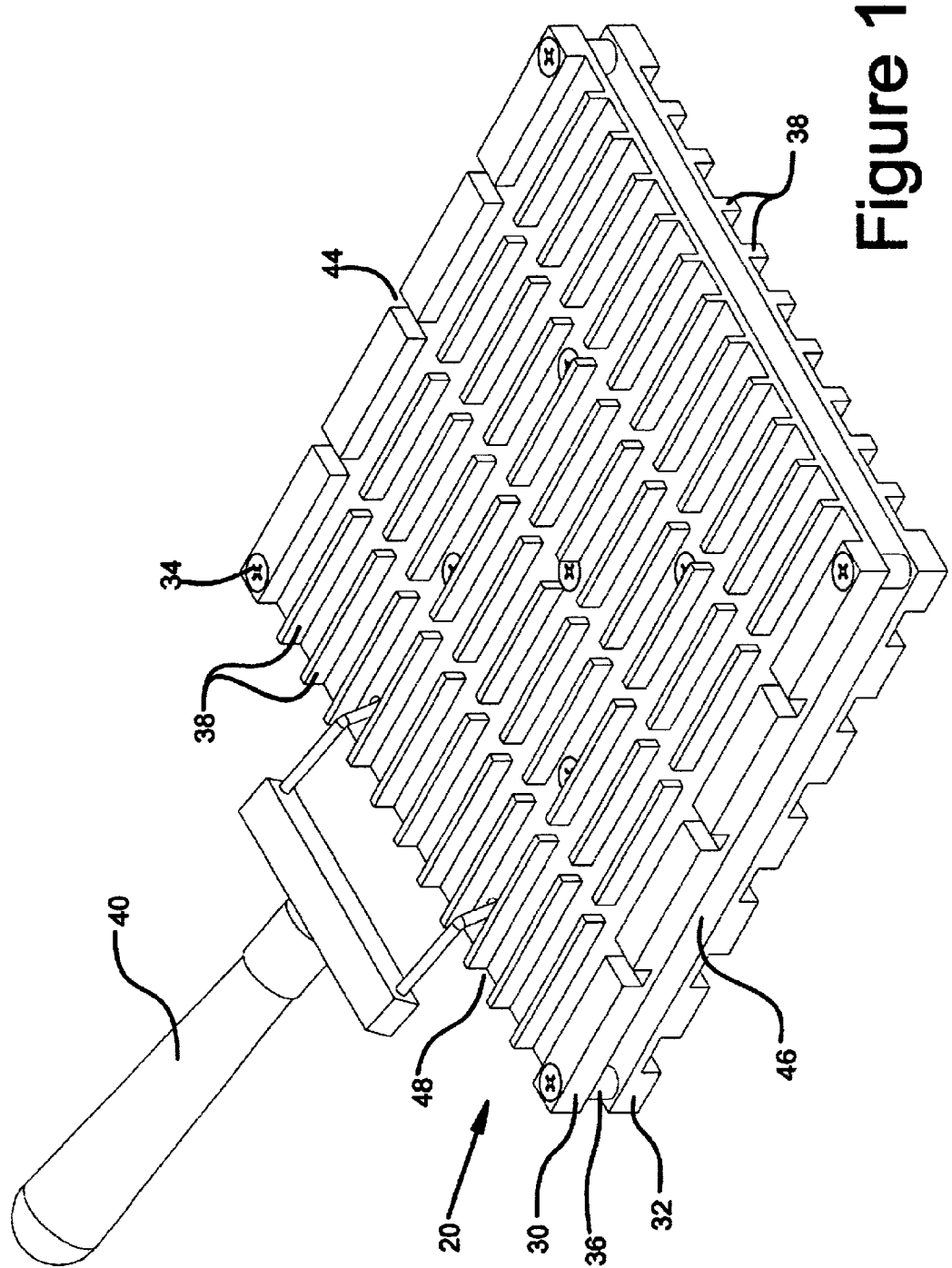
FIG. 1 is a perspective view looking at the heat reducer from one corner.
Figure 2:
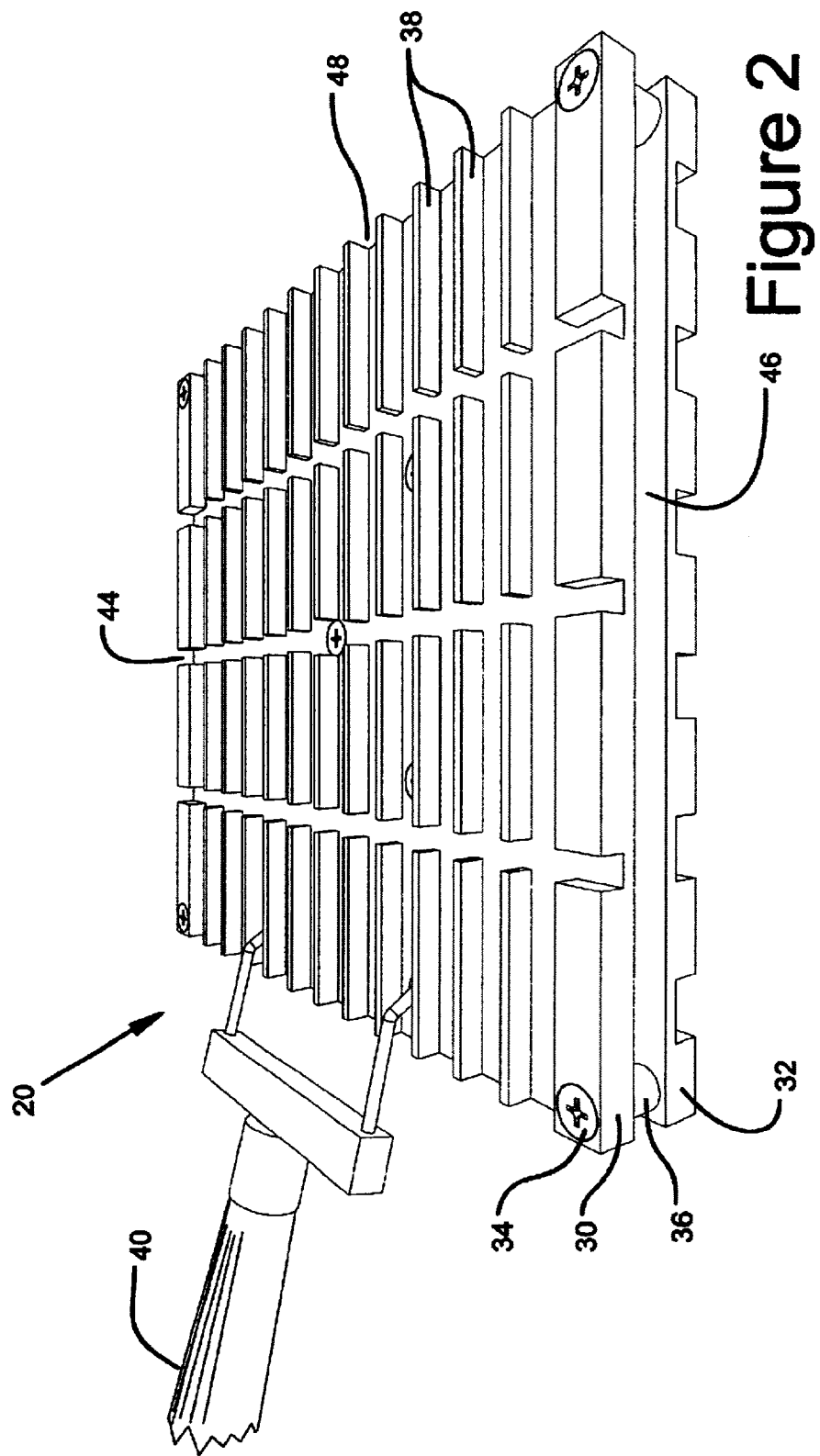
FIG. 2 is a perspective view looking across the heat reducer.
Figure 3:
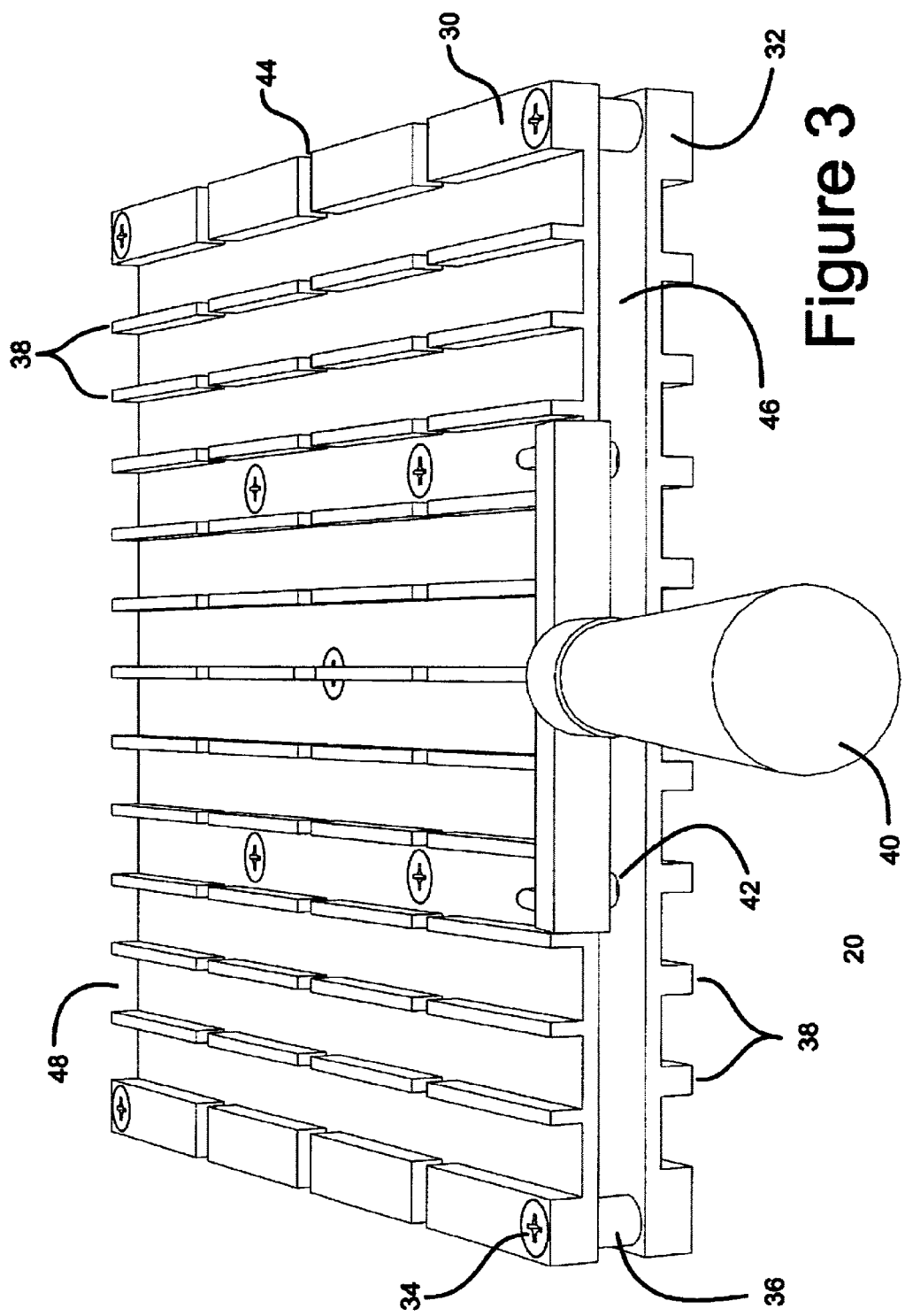
FIG. 3 is a perspective view looking at the heat reducer from the handle.
Figure 5:
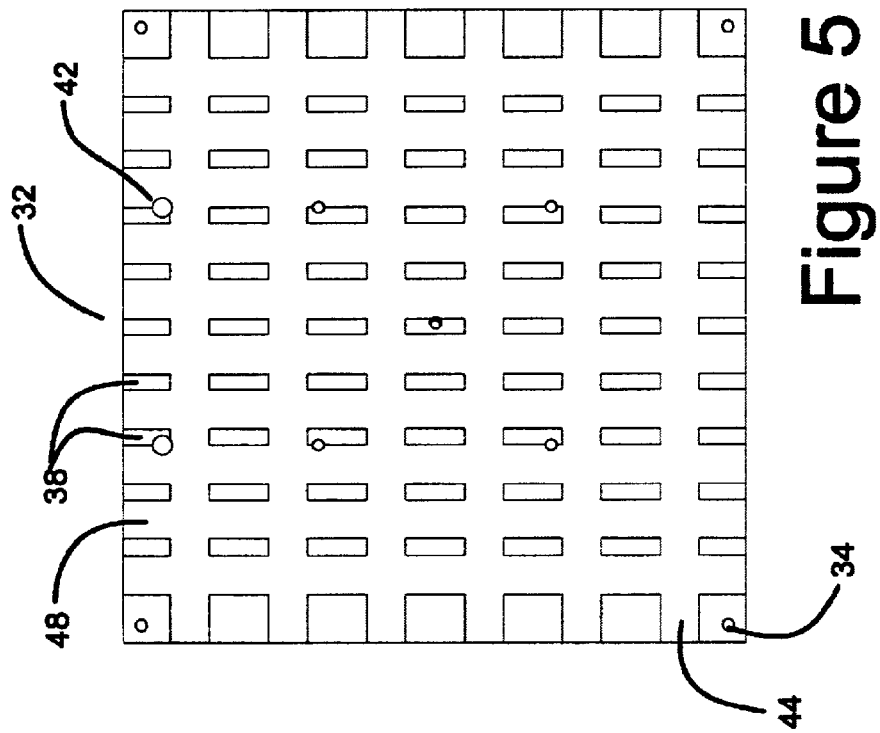
FIG. 5 is an engineering plan view of the bottom of the heat reducer.
Figure 4:
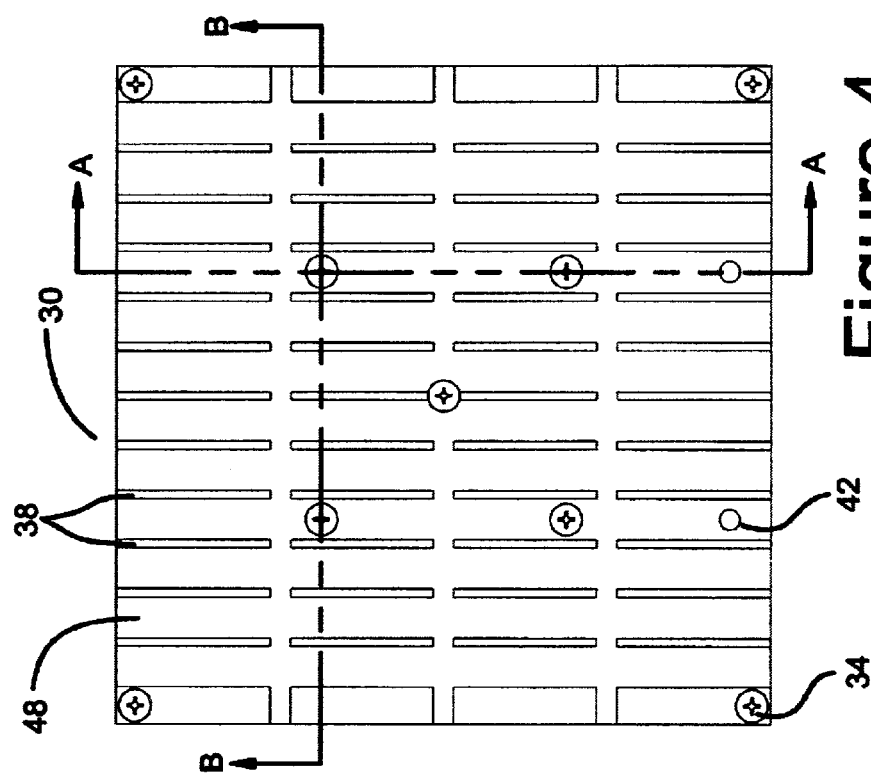
FIG. 4 is an engineering plan view of the top of the heat reducer.

Referring to FIG. 1, the heat reducer 20 is pictured in a perspective view which incorporates the elements and features of the heat reducer. Although the heat reducer will be described with reference to embodiments shown in the drawings, it should be understood that the heat reducer can be embodied in many alternate forms of embodiments. In addition, any suitable size, shape or type of elements or materials could be used.

Referring to FIGS. 1 through 7 the heat reducer generally comprises a high-rate-plate 30, a low-rate-plate 32, which are fastened to each other with suitable fasteners 34, but kept from each other by spacers 36 creating an primary air-gap 46. Sections A—A and B—B in FIGS. 6 and 7 detail the fasteners 34 and spacers 36 further. A handle 40 is provided that engages with the heat reducer 20 by way of the handle holes 42. Stress relief notches 48 are provided along the sides of the top and bottom plates in the preferred embodiment or as required in alternate embodiments.

Operation—FIGS. 1 through 7

The low-rate-plate 32, as depicted is facing down so as to come into contact with a heat source normally used for cooking such as a gas or electric stove top burner. The high-rate-plate 30 is facing up so as to contact a pot via the fins 38. In practice a user will place the heat reducer 20 on the cooking heat source of choice, and then place the cooking vessel on top of the heat reducer 20 to obtain a lower heat transfer rate from the heat source to the cooking vessel. This prevents medium to fast boiling, scorching, and burning of food in the cooking vessel. The heat reducer 20 can be turned over so the low-rate-plate 32 contacts the pot thus reducing the area of conducting material in contact with the pot. This reduces the heat transferred to the pot even further.

Three fundamental ideas are employed in the reduction of the heat transfer. First the heat reducer employs the insulating effects of a primary air-gap 46 and a secondary air-gap 48. Second the heat reducer employs a substantial reduction in the surface area of hot material coming in contact with the pot via the use of fins 38. Third, the heat reducer attains a heat dissipation benefit via the fins 38, the primary air-gap 46, and the secondary air-gap 48, working in concert.

The first insulation effects come from the primary air-gap 46 between the high-rate-plate 30 and the low-rate-plate 32. The gap is created by the spacers 36. Minimizing the cross section of the fasteners 34 and the spacers 36 prevents much direct conduction of heat from the low-rate-plate 32 to the high-rate-plate 30 via the conducting solid material that this invention will be made of. In the absence of a large direct conduction pathway via a solid material; the heat must then use the much less dense air in the primary air-gap 46 to reach the high-rate-plate 32. Since air is a poor conductor of heat relative to a solid conductor, the primary air-gap 46 thus acts to insulate the high-rate-plate 30 from the low-rate-plate 32 and the heat source. If the heat reducer 20 where to be turned over; the low-rate-plate 32 would be insulated from the high-rate-plate 30 instead.

The second insulation effect comes from the secondary air-gap 48. In principle this works the same as the primary air-gap 46 discussed above. The difference is that the fins 38 create the space between a substantial part of the high-rate-plate 30 and the cooking vessel itself.

Once the heat reaches the high-rate-plate it travels to the cooking vessel across the secondary air-gap 48 and through the fins 38. Conduction via the fins 38 is the most efficient path. Thus by reducing or increasing the size of the fins 38 one can regulate how much heat is finally conducted to the cooking vessel in a particular embodiment of the heat reducer. The fins 38 will have a larger cross section exposed to the cooking vessel on the high-rate-plates 30 versus the low-rate-plate 32. These differential fin 38 surface areas allow the user to achieve two different heat transfer rates by selecting either the high-rate-plate 30 or the low-rate-plate 32 to be used on the top in contact with the pot.

The fins 38 allow additional heat to be dissipated to the open air around the top of the heat reducer. This has the effect of cooling the top of the heat reducer 20 thus reducing the amount of heat energy available for transfer into the cooking vessel.

Another feature of the heat reducer 20 is the handle 40. The handle 40 can be inserted into the handle holes 42 in either the high-rate-plate 30 or low-rate-plate 32. This will allow the user to move the heat reducer 20 while it is hot and allow the handle 40 to then be removed again so that it is out of the way.

CONCLUSION

The heat reducer described above serves to diffuse and reduce the heat transmitted from a heat source to a vessel used for cooking food or heating other substances. The heat reducer achieve two rates of heat transfer by employing two plates with different amounts of heat conducting surface areas exposed to the cooking vessel. These plates are attached to each other by a means that spaces them apart from each other creating an insulating air-gap between the plates. Further heat reduction is achieved as the upper fins are exposed to the open air. The heat reducer described here achieves the following advantages:

a) provides a heat reducing device that prevents foods from boiling fast, scorching, sticking, or burning in the vessel in which they are being cooked in over long periods of time;

b) provides a heat reducing device which provides multiple rates of heat transfer allowing the user flexibility in achieving the desired results on different heat sources;

c) provides a heat reducing device that keeps the food at a consistent temperature d) allows one to construct the heat reducer in such a manner as to prevent warping and buckling as the device warms up and cools down e) provides a simple means to easily pick up and move the heat reducer such as a removable handle f) provides a heat reducer that is simple to make g) provides a heat reducer that is affordable.

Figure 8:
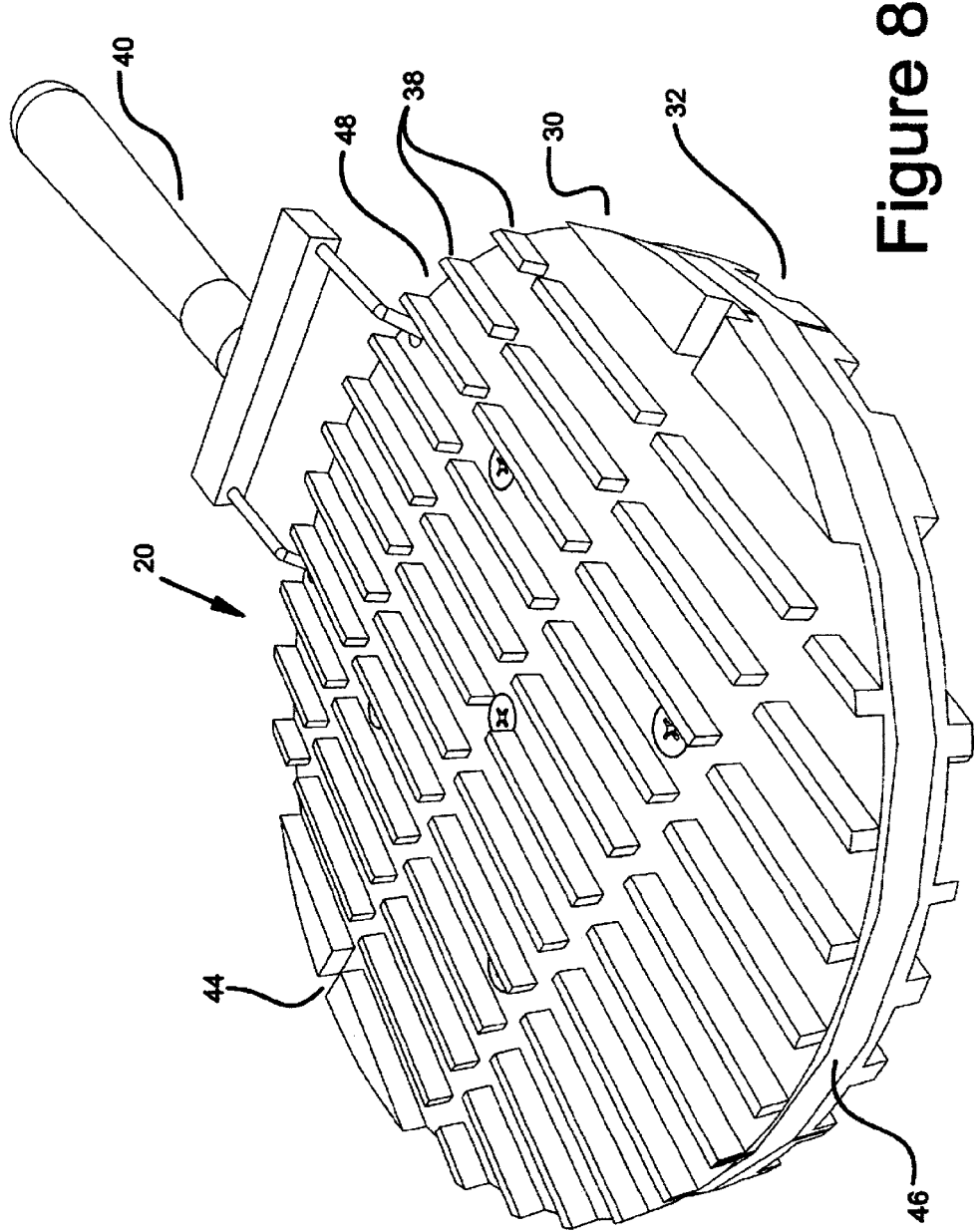
FIG. 8 is a perspective view of one alternate embodiment.
Figure 9:
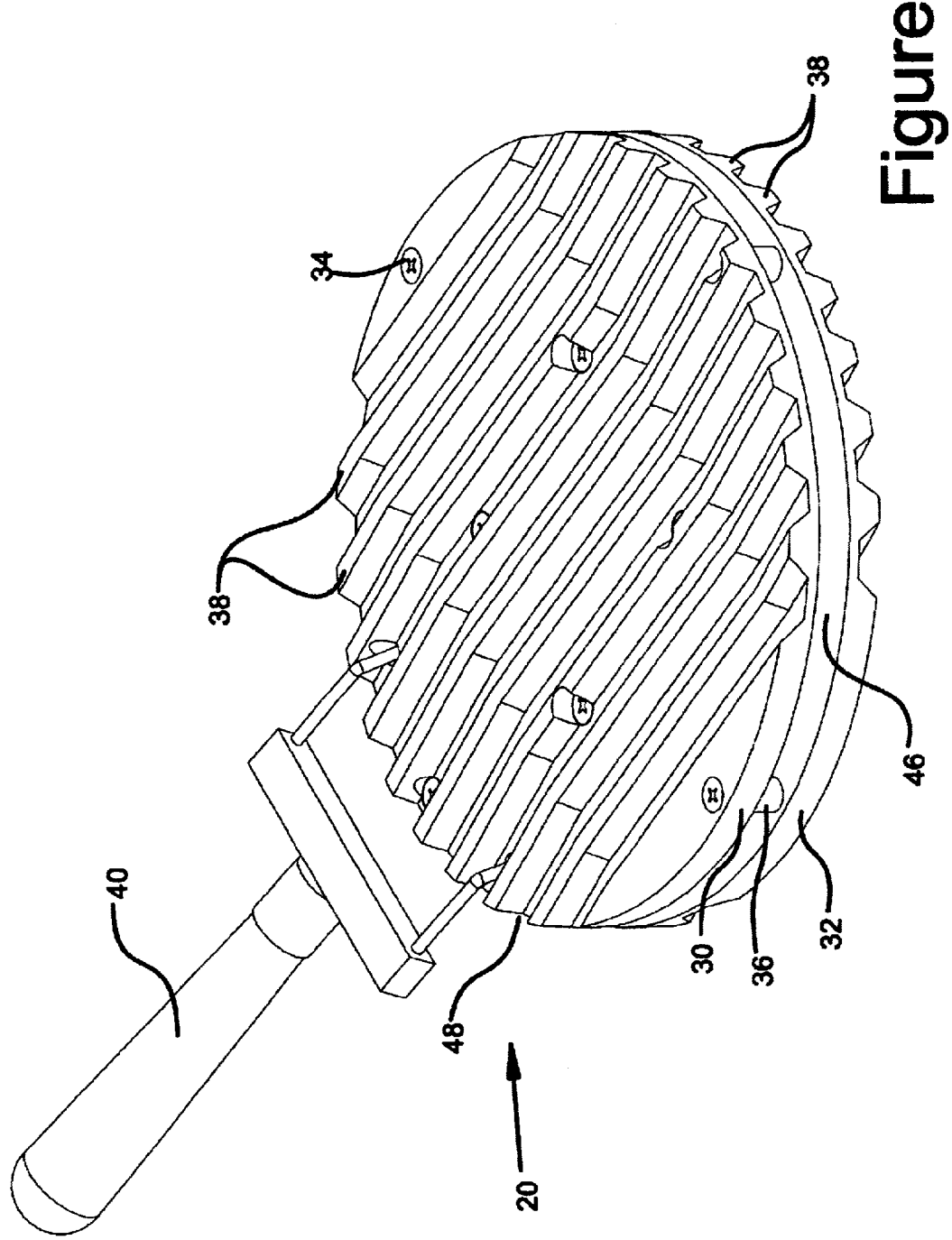
FIG. 9 is a perspective view of a second alternate embodiement

An alternative embodiment is shown in FIG. 8. This contains all the features described above except the general shape of the heat reducer 20 is round instead of square. Another alternative embodiment is shown in FIG. 9. This also contains all the features described above and in FIG. 8 with the exception that the profile of the fins 38 is tapered on the sides instead of being vertical.

Although the description above contains many specifics, these should not be construed as limiting the scope of this invention. These specifics are merely illustrations of the presently preferred embodiment of this invention. For example the heat reducer could have different shapes such as circular or octagonal in plan; the profile of the fins could be tapered, corrugated, or rounded; or the spacers could be of different sizes or profiles. Accordingly, the present invention is intended to embrace all such alternatives, modifications, and variances which fall within the scope of the appended claims.

I claim:

1. A heat reducer comprised of:

a) two plates made of a solid, or very heavy sheet of heat resistant material with one side that is flat and one side that has grooves or other relief in the surface reducing the surface area on the otherwise uninterrupted plane of that side, and b) with one plate having more surface area than the other plate on the relieved side, and c) with the plates attached to each other so that the flat or non-relieved sides of the plates face one another, and d) with spacers that keep the plates apart thus creating and air gap between the plates, and e) with a removable handle which engages the plates in holes through each plate.

* * * * *